(12) United States Patent
Tabacchi

(10) Patent No.: US 7,452,072 B2
(45) Date of Patent: Nov. 18, 2008

(54) METHOD FOR MANUFACTURING A RESILIENT HINGE DEVICE FOR SPECTACLES, DEVICE OBTAINED BY THE METHOD, AND SPECTACLES COMPRISING SAID DEVICE

(75) Inventor: Vittorio Tabacchi, Pieve di Cadore (IT)

(73) Assignee: Safilo Societa Azionaria Fabbrica Italiana Lavorazione Occhiali, Pieve di Cadore (IT)

( * ) Notice: Subject to any disclaimer, the term of this patent is extended or adjusted under 35 U.S.C. 154(b) by 244 days.

(21) Appl. No.: 11/579,422

(22) PCT Filed: May 13, 2004

(86) PCT No.: PCT/IT2004/000265
§ 371 (c)(1),
(2), (4) Date: Nov. 2, 2006

(87) PCT Pub. No.: WO2005/111701
PCT Pub. Date: Nov. 24, 2005

(65) Prior Publication Data
US 2007/0216857 A1 Sep. 20, 2007

(51) Int. Cl.
*G02C 5/22* (2006.01)
(52) U.S. Cl. .................. 351/153; 351/114; 351/140; 16/228
(58) Field of Classification Search ............ 351/41, 351/113, 114, 121, 140, 153; 16/228
See application file for complete search history.

(56) References Cited
U.S. PATENT DOCUMENTS
3,567,315 A * 3/1971 Speer .................. 351/113
4,818,093 A * 4/1989 Tabacchi ............... 351/113

FOREIGN PATENT DOCUMENTS
| BE | 792 135 A | 3/1973 |
| DE | 89 15 829 | 10/1991 |
| EP | 0 744 645 A | 11/1996 |
| FR | 2 250 127 | 5/1975 |
| GB | 1 003 661 | 9/1965 |
| WO | WO 90/01718 | 2/1990 |

* cited by examiner

*Primary Examiner*—Huy K Mai
(74) *Attorney, Agent, or Firm*—RatnerPrestia

(57) ABSTRACT

A method is provided for manufacturing a resilient hinge device for connecting the arms to a front frame of a mounting for spectacles. The device includes first and second hinge members which are pivotable about a hinge axis, and a resilient return between the hinge members. The method includes the steps of providing a box-like body open at a first and a second end thereof, axially opposed to one another, a slider member having a part formed with an eye or hinge pin, and at least one resilient member, and retaining same in a seat provided on the slider; and inserting the slider into the box-like body from the opening of the first end of the box-like body, with the part of the slider having the eye protruding outside the body through the opening provided in the second, opposed end of the body, the resilient member being located by the box-like body at the second end. The method also includes the steps of providing a closure member for the box-like body in the first end; firmly connecting the closure member to the body, such that the slider is retained so as to be slidably guided in the box-like body and is also displaceable relative to the box-like body counter to the resilient action exerted by the resilient member; housing the box-like body in a respective blind cavity provided in the front frame of the mounting, with the closure member facing the bottom of the cavity; and firmly connecting the box-like body to the frame such that the body is rigidly fixed in position, at least partially embedded in the front frame of the mounting, the part of the slider having the eye constituting one of the hinge members of the device. Also provided is the resilient hinge device and spectacles including such device.

25 Claims, 5 Drawing Sheets

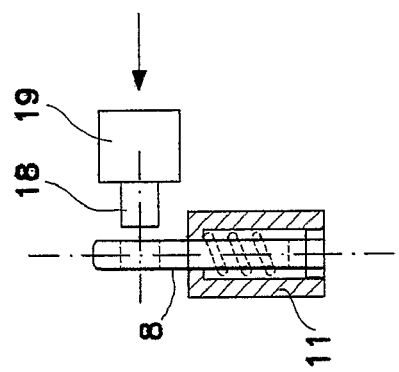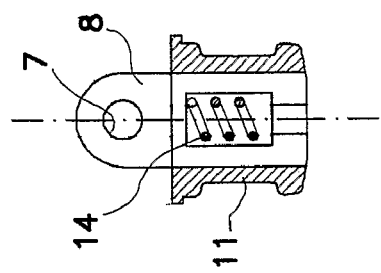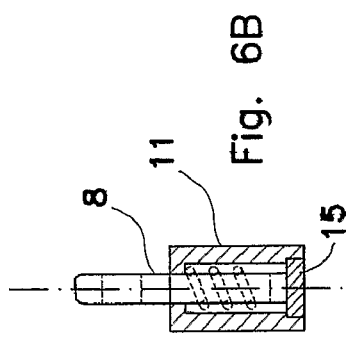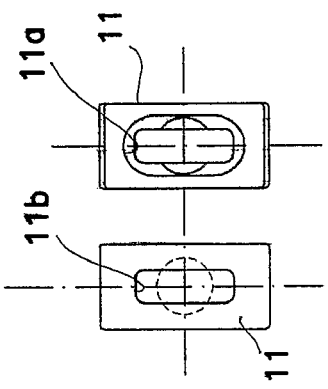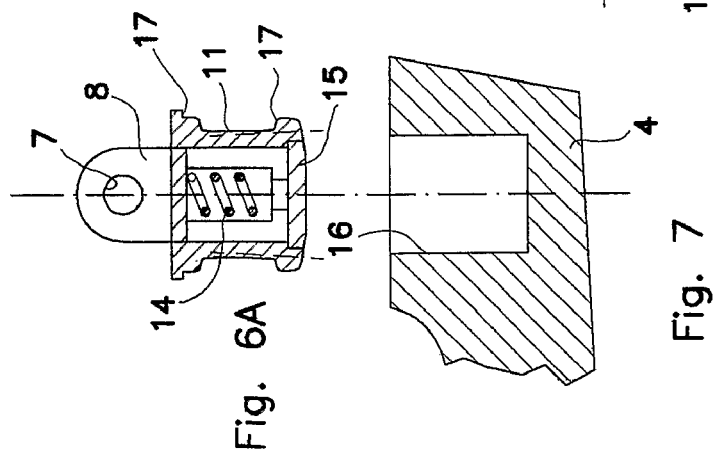

US 7,452,072 B2

METHOD FOR MANUFACTURING A RESILIENT HINGE DEVICE FOR SPECTACLES, DEVICE OBTAINED BY THE METHOD, AND SPECTACLES COMPRISING SAID DEVICE

This application is a U.S. National Phase Application of PCT International Application PCT/IT2004/000265, which is incorporated by reference herein.

TECHNICAL FIELD

The present invention concerns a method for manufacturing a resilient hinge device for spectacles. The invention is also aimed at a hinge device produced by the aforesaid method and to a pair of spectacles comprising the device.

BACKGROUND OF THE INVENTION

In the technical field of reference of the present invention, resilient hinge devices are known for the articulation of the arms to the front frame of the mounting of the spectacles, wherein provision is made for a springing mechanism which allows the resilient return of the arm towards preferred angular positions. In a first known type, provision is made for the springing mechanism to be retained on the arm of the spectacles, involving in this case a certain addition to the size of the arm which may be unwanted in the production of spectacles with particularly light and slim arms. Solutions are also known in which the springing mechanism is mounted on the hinge member fixed to the front mounting of the spectacles, involving, however, a rather complex assembly and not particularly reduced dimensions of the components constituting the resilient hinge.

BRIEF DESCRIPTION OF THE INVENTION

A principal aim of the present invention is that of providing a method for manufacturing a hinge device and a device thus obtained which permit simplified and rapid assembly with a reduced number of components having extremely restricted dimensions, such as to reduce the overall dimensions of the hinge device.

Another aim is that of providing a method and a device for producing resilient hinges which are particularly light and of restricted dimensions such as to enable them to be located in the front part of the mounting, without involving any bulkiness on the arm, and also obtaining appreciable aesthetic results, consequently permitting the provision of resilient hinges on spectacles with particularly slim arms.

These and other aims, which will become clear hereinafter, are achieved by the invention by means of a method for manufacturing a hinge device and a device thus obtained, and spectacles including such device as subsequently described.

BRIEF DESCRIPTION OF THE DRAWINGS

Further characteristics and advantages of the invention will become clearer from the following detailed description of a preferred exemplary embodiment thereof, illustrated by way of non-limiting example with reference to the appended drawings, in which:

FIGS. 6A and 6B are views in side elevation and in partial section of the detail of the device of the preceding figures in the assembled state according to the method of the invention, FIG. 7 is a view in section of a detail of the spectacles of FIG. 1, FIGS. 8 and 9 are views in side elevation of a detail of the device of FIG. 6A according to opposite viewpoints, FIGS. 11 and 12 are views corresponding to those of FIGS. 6A and 6B of a further alternative embodiment of the invention.

DETAILED DESCRIPTION OF THE INVENTION

Figure 1:
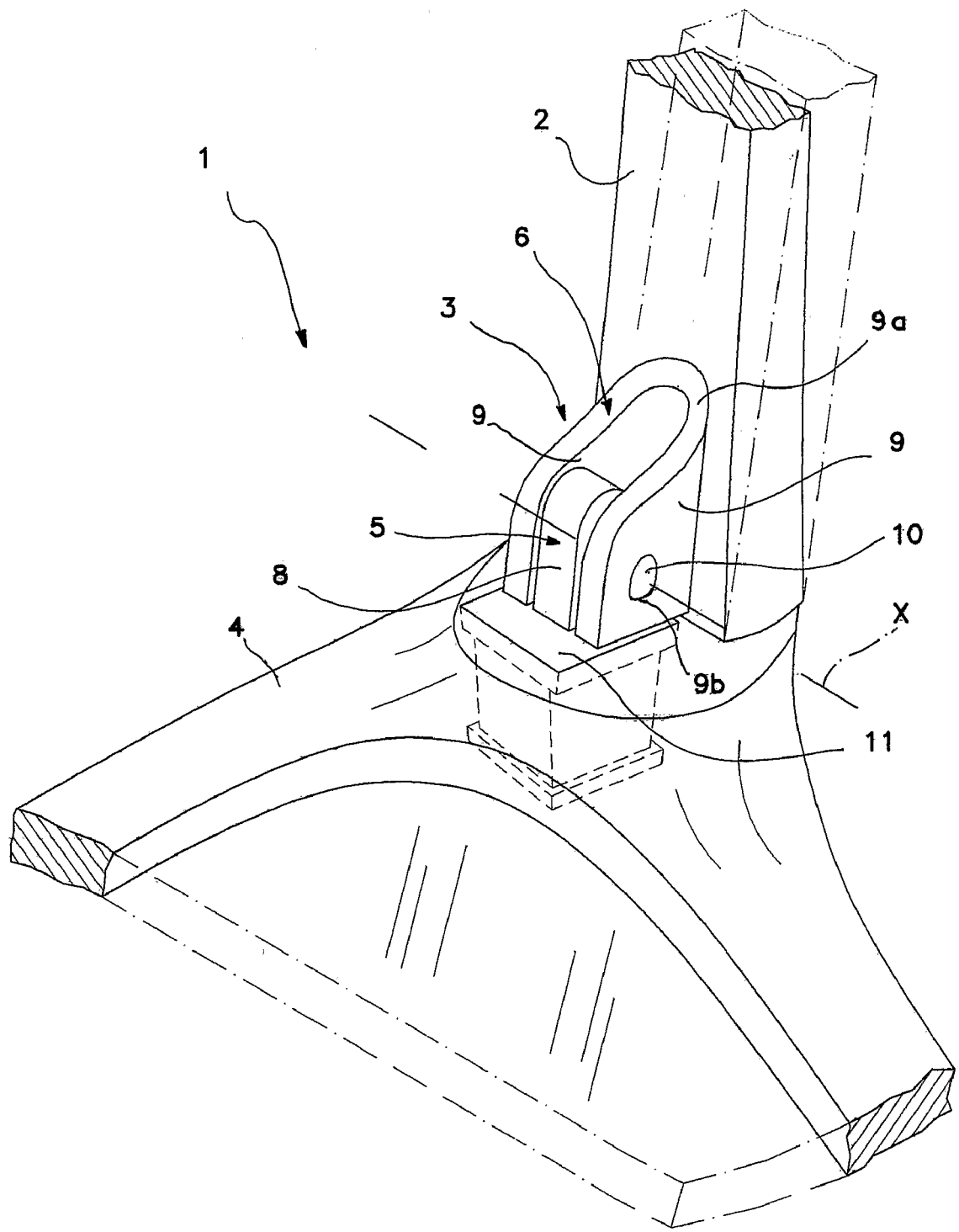
FIG. 1 is a perspective view in partial section and on an enlarged scale of a pair of spectacles including resilient hinge devices according to the present invention.

With reference to the figures mentioned, the reference 1 indicates as a whole a pair of spectacles, shown only partially in FIG. 1, comprising, for each arm 2, a resilient hinge device 3 for the articulation of the arms 2 to a front frame 4 of the mounting of the spectacles, produced in accordance with the method of the present invention.

The resilient hinge device 3 comprises a first and a second hinge member 5, 6, respectively connected to the front frame 4 of the mounting and to the arm 2, and which are capable of pivoting relative to one another about a hinge axis, indicated by X in the figures.

More particularly, the first hinge member 5 comprises an eye formation 7 provided on a slider member 8 described in greater detail hereinafter, while the second hinge member 6 comprises a fork-like formation 9a with opposed branches 9 firmly connected to the arm 2. The slider 8 is articulated, by means of the eye formation 7, between the fork branches of the second hinge member 6. This articulation is conveniently produced by means of a screw or pin 10 coaxial with the axis X, passing through the eye 7 and through corresponding coaxial holes 9b provided in the respective fork branches 9 of the second hinge member 6.

The first member 5 of the resilient hinge is further conveniently obtained according to the steps of the manufacturing method described hereinafter.

Figure 5:
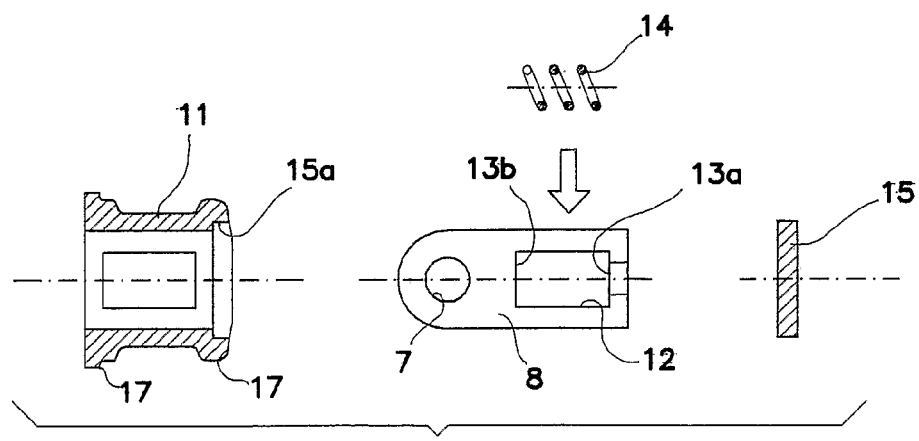
FIG. 5 is a view in side elevation and in partial section of the members making up the detail of FIGS. 4A and 4B of the hinge device produced according to the method of the invention.

A first step (see FIG. 5 in particular) provides for the arrangement of a hollow box-like body 11 open at a first and a second end, axially opposed to one another, wherein the corresponding openings are respectively indicated by 11a, 11b.

Arranged separately is the slider member 8, having a substantially plate-like structure in which is provided, at one of its ends, the eye formation 7. In the slider 8 there is further provided a through opening 12 having a closed contour, with a preferably rectangular cross-section of the opening. At the opposed minor sides of the cross-section, in the opening 12 respective facing surfaces 13a, 13b of the slider are shown which constitute respective axial locating means for the fitting of a helical spring 14, within the seat defined by the through opening 12. The spring 14 is produced with a profile in plan of the turns having a circular or oblong shape, for example elongated in one or two directions, in particular perpendicular to one another (including also profiles of elliptical shape). The spring is mounted on the slider 8 with a slight resilient pre-loading such as to guarantee stability in the retention of the spring between the locating surfaces 13a, 13b, on board the slider 8. The locating surfaces 13a, 13b may be provided with seats for the ends of the spring 14. It should be noted that the helical turns of the spring 14 protrude from the opening 12, substantially symmetrically with respect to a middle plane of the slider, directed perpendicularly to the axis of the eye 7. The surface 13a conveniently has a circular shape to ensure complete support at the corresponding end turn of the spring 14.

In a further step of the method, provision is made to insert the slider 8 equipped with the spring 14 inside the box-like body 11 through the opening 11a provided at the first end. The opening in that end is shaped in such a way as to permit the passage of the slider and also of the spring protruding laterally therefrom. To this end, the opening 11a is shaped as an elongated rectangular slot with a central widening of circular shape (of a diameter such as not to interfere with the dimensions of the circular turns of the spring), as shown in FIG. 9. On the insertion of the slider 8, the part having the eye 7 is guided to pass through the opening 11b provided in the box-like body 11 at the second end, in order to protrude outside the box-like body itself. The opening 11b has a rectangular cross-section with dimensions such as to permit exclusively the passage of the slider 8 and to interfere instead with the spring 14 which is located by the box-like body at said opening.

Figure 4A:
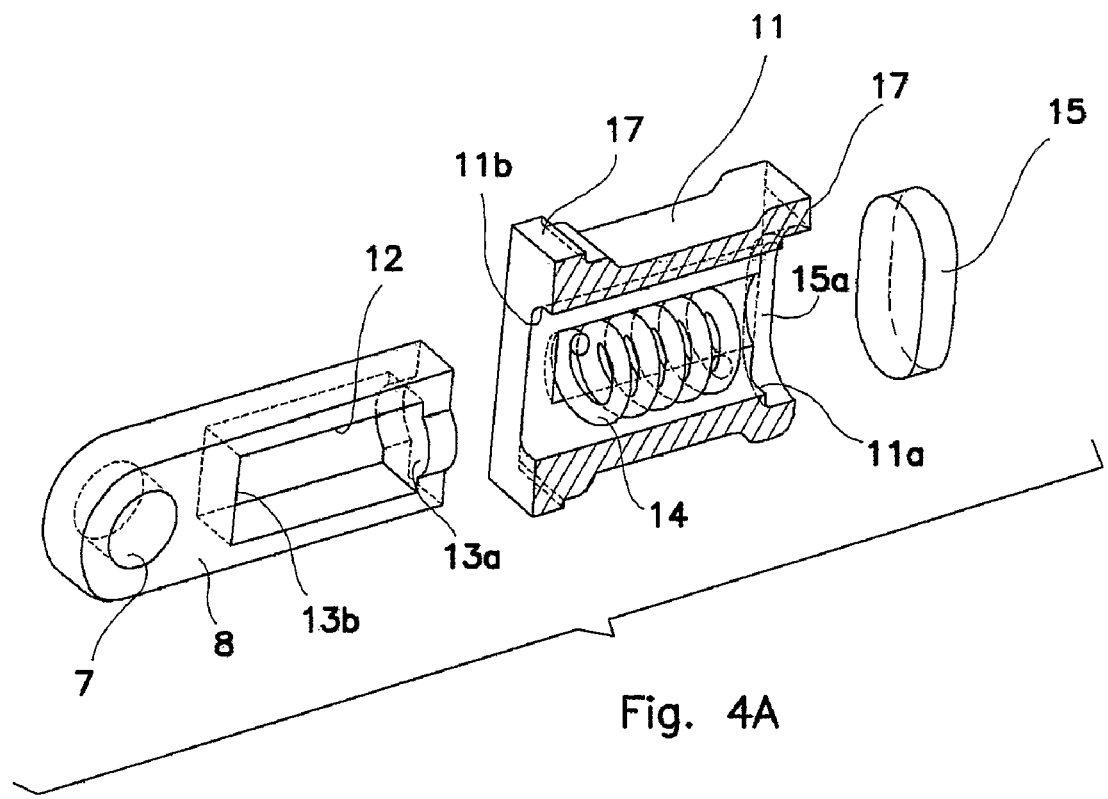
FIG. 4A is an exploded perspective view, in partial section, of a detail of the device produced according to the invention.
Figure 4B:
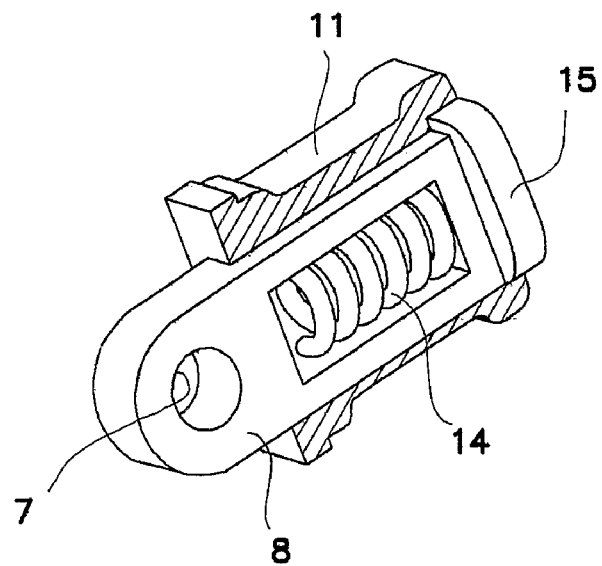
FIG. 4B is a perspective view of the detail of FIG. 4A in the assembled state.
Figure 10B:
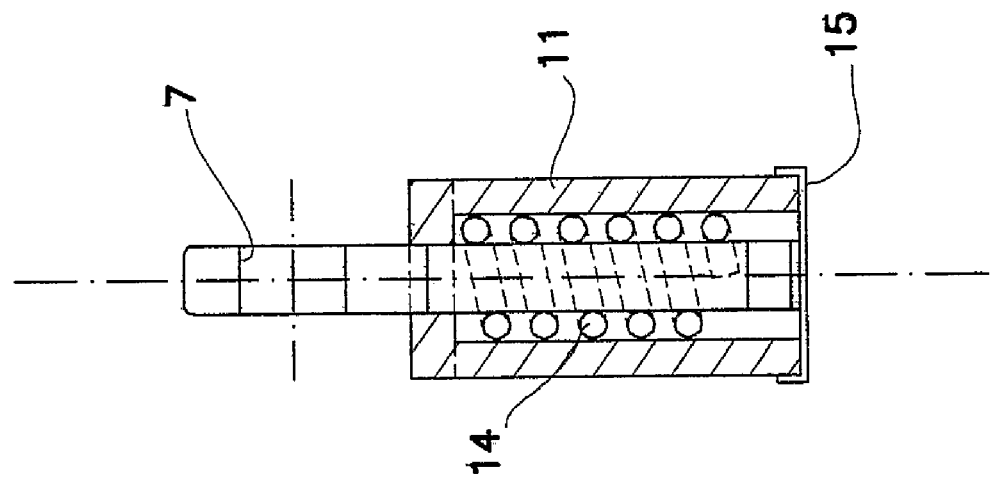
FIGS. 10A and 10B are views corresponding to those of FIGS. 6A and 6B of an alternative embodiment of a detail of the device of the invention.
Figure 10A:
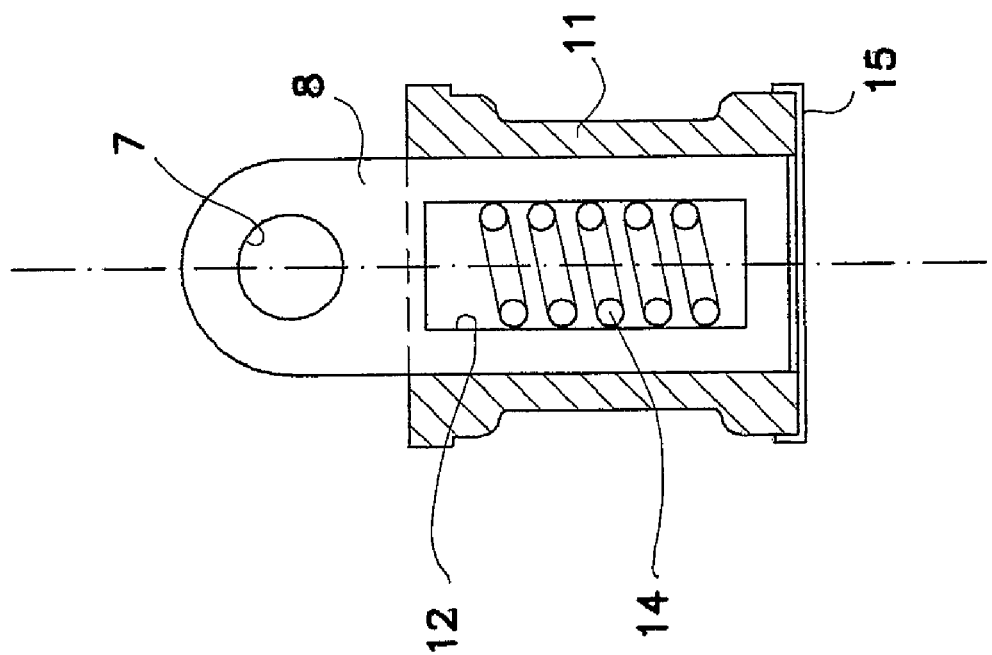

Once the slider 8 is inserted into the box-like body 11 with complete seating of the spring 14, the body is closed at the first end by means of a closure member, designated by 15. The closure member may be produced in the shape of a cup (with raised perimetrical rim, as illustrated in FIGS. 10A and 10B) or a stopper (FIGS. 4A and 4B), in this second case being capable of being at least partially engaged with a respective seat 15a provided in the box-like body and firmly connected to the body for example by locking by pressure interference (internal or external). Alternatively, the closure member 15 may be obtained more simply from a thin plate, for example by shearing, and is arranged to be welded (for example by means of spot welding) outside of the box-like body, in this case without any provision of a coupling seat in the box-like body. In the case of the cup shape, the closure member 15 is press-fitted externally. Depending on the selected embodiment, the closure member 15 may be obtained from plastics material (preferable in the case of pressure locking on the body 11) or from metallic material (preferable in the case of external welding) or press-fitted externally.

It should be noted that following the fixing of the closure member 15 on the body 11, there may conveniently be induced in the spring 14 a second resilient pre-loading which is effected on mounting of the arm 2.

Once the closure member 15 has been firmly fixed to the box-like body, the slider 8 is slidably guided in the body 11 and also displaceable relative to the body against the resilient action of the spring 14. In other words, the withdrawal of the slider 8 from the body 11 through the opening 11b of the second end takes place counter to the spring 14, which therefore constitutes a means for resilient return of the slider.

The method of the invention also provides for the arrangement in the front frame 4, at the areas of articulation of the arms 2, respective blind cavities 16 arranged for housing the hinge members 5 assembled in the preceding steps. Into each cavity 16, the corresponding assembled box-like body 11 is inserted with the closure member 15 facing the bottom of the cavity, and then the body 11 is rigidly connected to the frame, for example by means of ultrasound insertion technology. In this case the body 11 is provided with reliefs 17 protruding externally, which constitute means for catching on to the surfaces of the cavity in the localised fusion of the material effected by the ultrasonic insertion process.

Figure 2:
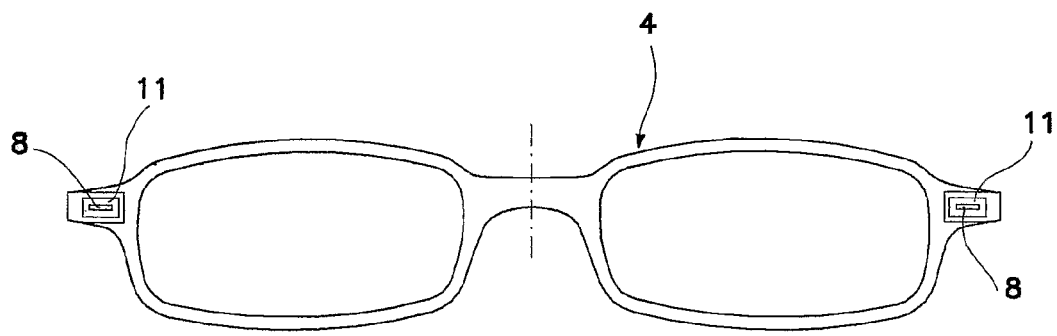
FIGS. 2 and 3 are respectively a view in front elevation and in plan from above of the front frame of the mounting of the spectacles of FIG. 1.
Figure 3:
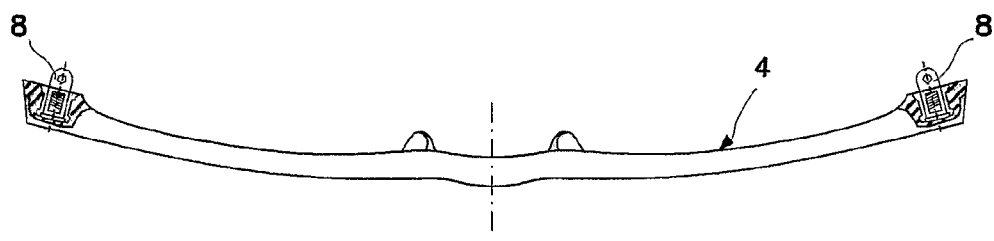

The result of this is that the box-like body 11 is rigidly fixed to the front frame in a position embedded in the frame itself, with only the part having the eye 7 protruding from the mounting of the spectacles for the articulation of the arm 2 (FIGS. 2 and 3).

FIG. 1 shows the hinge device thus obtained, assembled to the arm 2 of the spectacles, and dash-dotted lines indicate the opened out angular position which the arm 2 can assume owing to the resilient hinge according to the invention.

It should further be noted that the box-like body 11, once assembled with the slider 8 as described above, constitutes the resilient member of the hinge in the mounting step, in the form of a unit that can be manipulated individually, facilitating and simplifying the subsequent steps of assembly of the spectacles.

In a variant of the method of the invention, described with reference to FIGS. 11 and 12, in which details similar to the preceding example are designated by the same numerical references, provision is made for the box-like body 11 to be assembled with the slider 8 and the spring 14 without the provision of the closure member 15. In this case, the retention of the slider 8 in the position inserted into the body 11 is ensured in the steps preceding the connection of the body to the frame 4, by auxiliary equipment, for example comprising a pin 18 standing up from a small block 19 and arranged to be inserted into the eye 7 and oppose (by means of the block 19) the action of the resilient pre-loading of the spring 14, impeding the emergence of the slider 8 from the opening 11a. Once the body 11 is inserted into the corresponding cavity 16 of the front frame and is suitably secured thereto (for example by ultrasound insertion), the pin 18 is disengaged from the eye 7, thus producing a resilient hinge device completely embedded in the front frame, with equal functionality to the device of the preceding example.

The invention thus achieves the aims proposed, providing numerous advantages with respect to the known solutions.

A principal advantage lies in the fact that the resilient hinge device obtained by the method of the invention includes an assembly with a reduced number of components of extremely restricted dimensions for a particularly reduced overall dimension which makes it possible to embed the device within the front frame of the spectacles. In this way there is no bulkiness of the resilient hinge on the arm of the spectacles, advantageously increasing its lightness and at the same time obtaining an improved aesthetic impact overall. Moreover, with the method of the invention, resilient hinges may also be provided in spectacles with particularly slim arms.

Another advantage lies in the easier assembly of the resilient hinge obtained with the method of the invention, which makes it possible to produce the hinge member provided with the resilient return in a unit that can be manipulated individually, simplifying and speeding up the operations of subsequent handling and mounting of the hinge on the front frame of the spectacles.

The invention claimed is:

1. A method for manufacturing a resilient hinge device for connecting arms to a front frame of a mounting for spectacles, the device including a first and a second hinge member which are pivotable about a hinge axis (X), and resilient return means between said hinge members, the method comprising the steps of:

providing a box-like body open at a first and a second end thereof, axially opposed to one another, providing a slider member having a part formed with an eye or hinge pin, providing at least one resilient member and retaining same in a seat provided on the slider, inserting the slider into the box-like body from the opening of said first end of the box-like body, with the part of the slider having the eye protruding outside said body through the opening provided in the second, opposed end of said body, said resilient member being located by the box-like body at the second end, providing a closure member for the box-like body in said first end, and firmly connecting said closure member to said body, such that the slider is retained so as to be slidably guided in the box-like body and is also displaceable relative to the box-like body counter to the resilient action exerted by said resilient member, housing said box-like body in a respective blind cavity provided in the front frame of the mounting, with said closure member facing the bottom of the cavity, firmly connecting the box-like body to the frame such that said body is rigidly fixed in position, at least partially embedded in the front frame of the mounting, the part of the slider having the eye constituting one of said hinge members of the device.

2. The method according to claim 1, wherein said closure member is secured to the box-like body by welding.

3. The method according to claim 2, wherein said welding is spot welding.

4. The method according to claim 1, wherein said closure member is secured to the box-like body by pressure locking.

5. The method according to claim 4, wherein said closure member has a perimetrical rim capable of being externally coupled to the box-like body with mutual external pressure locking.

6. The method according to claim 4, wherein provision is made for the step of arranging a seat on the box-like body for at least partial seating of said closure member.

7. The method according to claim 1, wherein said closure member is produced from plastics material or from sheet metal.

8. The method according to claim 1, wherein said front frame is made of metallic material and said box-like body is rigidly connected to the cavity of said front frame by welding.

9. The method according to any claim 1, wherein said front frame is made of plastics material and the fixing of the box-like body to said frame is obtained by means of ultrasound insertion.

10. The method according to claim 1, wherein said resilient member is produced as a helical spring.

11. The method according to claim 10, wherein said helical spring has turns with a profile having a shape in plan which is circular or elliptical or generally elongated in one or two directions perpendicular to one another.

12. The method according to claim 11, comprising the further step of arranging in said slider a through opening having a cross-section of closed contour, in which a pair of opposed surfaces are defined, constituting locating surfaces for the retention of said spring.

13. The method according to claim 10, comprising the further step of arranging in said slider a through opening having a cross-section of closed contour, in which a pair of opposed surfaces are defined, constituting locating surfaces for the retention of said spring.

14. The method according to claim 13, wherein said spring is housed between said opposed locating surfaces with resilient pre-loading.

15. The method according to claim 10, wherein the first hinge member is obtained by assembly of the box-like body, the slider equipped with said spring and said closure member, in the form of a unit that can be manipulated individually.

16. A resilient hinge device for connecting the arms to a front frame of a mounting for spectacles and produced according to the method of claim 1.

17. Spectacles comprising a front mounting frame, respective arms and at least one resilient hinge device according to claim 16 for connecting the arms to the front frame in an articulated manner.

18. A method for manufacturing a resilient hinge device for connecting the arms to a front frame of a mounting for spectacles, the device including a first and a second hinge member which are pivotable about a hinge axis (X), and resilient return means between said hinge members, the method comprising the steps of:

providing a box-like body open at a first and a second end thereof, axially opposed to one another, providing a slider member having a part formed with an eye or hinge pin, providing at least one resilient member and retaining same in a seat provided on the slider, inserting the slider into the box-like body from the opening of said first end of the box-like body, with the part of the slider having the eye protruding outside said body through the opening provided in the second, opposed end of said body, said resilient member being located by the box-like body at the second end, providing auxiliary retaining means that are active between the slider and the body for retaining the slider part equipped with said resilient member in a position completely inserted into the body, counter to the resilient action exerted by said resilient member, housing said box-like body in a respective blind cavity provided in the front frame of the mounting, firmly connecting the box-like body to the frame such that said body is rigidly fixed in position, at least partially embedded in the front frame of the mounting, the part of the slider having the eye constituting one of said hinge members of the device, and disengaging said auxiliary retaining means.

19. The method according to claim 18, wherein said auxiliary retaining means comprise spacer means acting between the part shaped with an eye and said box-like body.

20. The method according to claim 19, wherein said auxiliary means comprise at least one pin capable of engaging the eye formation and a small block firmly connected to the pin and located between the pin and the second end of the box-like body, for retaining the slider in a preselected position relative to the box-like body.

21. The method according to claim 18, wherein said auxiliary means comprise at least one pin capable of engaging the eye formation and a small block firmly connected to the pin and located between the pin and the second end of the box-like body, for retaining the slider in a preselected position relative to the box-like body.

22. A resilient hinge device for connecting the arms to a front frame of a mounting for spectacles and produced according to the method of claim 18.

23. Spectacles comprising a front mounting frame, respective arms and at least one resilient hinge device according to claim 22 for connecting the arms to the front frame in an articulated manner.

24. A resilient hinge device for connecting arms to a front frame of a mounting for spectacles, the device comprising:
- first and second hinge members pivotable about a hinge axis (X), and resilient return means between said hinge members,
- a box-like body open at first and second ends which are axially opposed to one another,
- a slider member having a part formed with an eye or hinge pin,
- at least one resilient member in a seat in the slider,
- the slider being in the box-like body and extending from the opening of said first end of the box-like body, with the part of the slider having the eye protruding outside said body and through the opening provided in the second, opposed end of said body, said resilient member being located by the box-like body at the second end,
- a closure member for the box-like body and disposed at said first end such that the slider is retained so as to be slidably guided in the box-like body and is also displaceable relative to the box-like body counter to the resilient action exerted by said resilient member, and
- the part of the slider having the eye being one of said hinge members of the device.

25. Spectacles comprising:
- a front mounting frame, respective arms, and at least one resilient hinge device for connecting the arms to the front frame in an articulated manner, the resilient hinge device including:
  - first and second hinge members which are pivotable about a hinge axis (X), and resilient return means between said hinge members,
  - a box-like body open at first and second ends which are axially opposed to one another,
  - a slider member having a part formed with any eye or hinge pin,
  - at least one resilient member in a seat provided in the slider,
  - the slider being in the box-like body and extending from the opening of said first end of the box-like body, with the part of the slider having the eye protruding outside said body and through the opening provide in the second, opposed end of said body, said resilient member being located by the box-like body at the second end,
  - a closure member for the box-like body and disposed at said first end, such that the slider is retained so as to be slidably guided in the box-like body and is also displaceable relative to the box-like body counter to the resilient action exerted by said resilient member,
  - said box-like body being housed in a respective blind cavity in the front mounting frame, with said closure member facing a bottom of the cavity, and
  - the box-like body connected to the frame such that said body is rigidly fixed in position, at least partially embedded in the front mounting frame, the part of the slider having the eye being one of said hinge members of the resilient hinge device.

* * * * *